US009330113B2

(12) United States Patent
Sears

(10) Patent No.: US 9,330,113 B2
(45) Date of Patent: May 3, 2016

(54) PROVIDING CONTENT BASED ON IMAGE ITEM

(71) Applicant: Verizon Patent and Licensing Inc., Arlington, VA (US)

(72) Inventor: Bruce A. Sears, Rockwall, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/337,933

(22) Filed: Jul. 22, 2014

(65) Prior Publication Data
US 2016/0026628 A1 Jan. 28, 2016

(51) Int. Cl.
G06K 9/62 (2006.01)
G06F 17/30 (2006.01)
G06K 9/46 (2006.01)
G06K 9/18 (2006.01)

(52) U.S. Cl.
CPC .............. *G06F 17/3028* (2013.01); *G06K 9/18* (2013.01); *G06K 9/46* (2013.01); *G06K 9/6201* (2013.01); *G06K 9/6267* (2013.01)

(58) Field of Classification Search
USPC ........... 382/190, 209, 224, 307; 358/537, 452
See application file for complete search history.

(56) References Cited

U.S. PATENT DOCUMENTS

| 7,680,314 | B2 * | 3/2010 | Hong ............................ 382/131 |
| 7,787,678 | B2 * | 8/2010 | Unal ..................... G06T 7/0012 |
| | | | 382/128 |
| 8,144,921 | B2 * | 3/2012 | Ke ..................... G06K 9/00463 |
| | | | 382/100 |
| 8,184,155 | B2 * | 5/2012 | Ke ..................... G06K 9/00463 |
| | | | 348/142 |
| 8,276,088 | B2 * | 9/2012 | Ke ........................ G06K 9/2081 |
| | | | 715/764 |
| 8,296,456 | B2 * | 10/2012 | Klappert ....................... 709/236 |
| 2012/0030575 | A1 * | 2/2012 | Cok ............................ 715/738 |

OTHER PUBLICATIONS

Wikipedia, "Augmented reality", http://en.wikipedia.org/wiki/Augmented_reality, Jul. 7, 2014, 22 pages.
Metaio GmbH, "Metaio Developer Portal—General Information", http://dev.metaio.com/visual-search/general-information/, Sep. 30, 2013, 2 pages.

* cited by examiner

*Primary Examiner* — Yosef Kassa

(57) ABSTRACT

A device may analyze an image and identify an image item included in the image based on analyzing the image. The device may identify content relating to the image item. For example, the device may identify an application, of the device, relating to the image item. The device may provide, for display with the image, information indicating that the content is available and receive input indicating a desire for the content. The device may provide the content for display based on receiving the input indicating the desire for the content. For example, the device may initiate the application and cause the content to be provided via the application.

20 Claims, 10 Drawing Sheets

500

Wait time before analyzing images: [10 Seconds]

Maximum quantity of images to be transmitted to server per period of time: [1 image per minute]

Information regarding location(s) for using application:
○ Everywhere
● Custom

Include Locations: [Sports arenas/stadiums, tourist locations, home]

Exclude Locations: [work]

Information for applications to be opened:
○ Default
● Custom

| App | Image Items | Additional Information |
|---|---|---|
| Real Estate | Homes, buildings, MLS identifiers, For Sale ads, For Rent ads | Perform search regarding image item |
| Insurance | Cars, trucks, motorcycles, vehicle identification numbers | Perform search for quotes regarding information |
| Sports | Team logo, team name, stadium/ sports arena, team personnel | |

User interest(s) regarding applications to be opened: [Sports, cooking, traveling, weather, traffic]

[SAVE]

FIG. 5

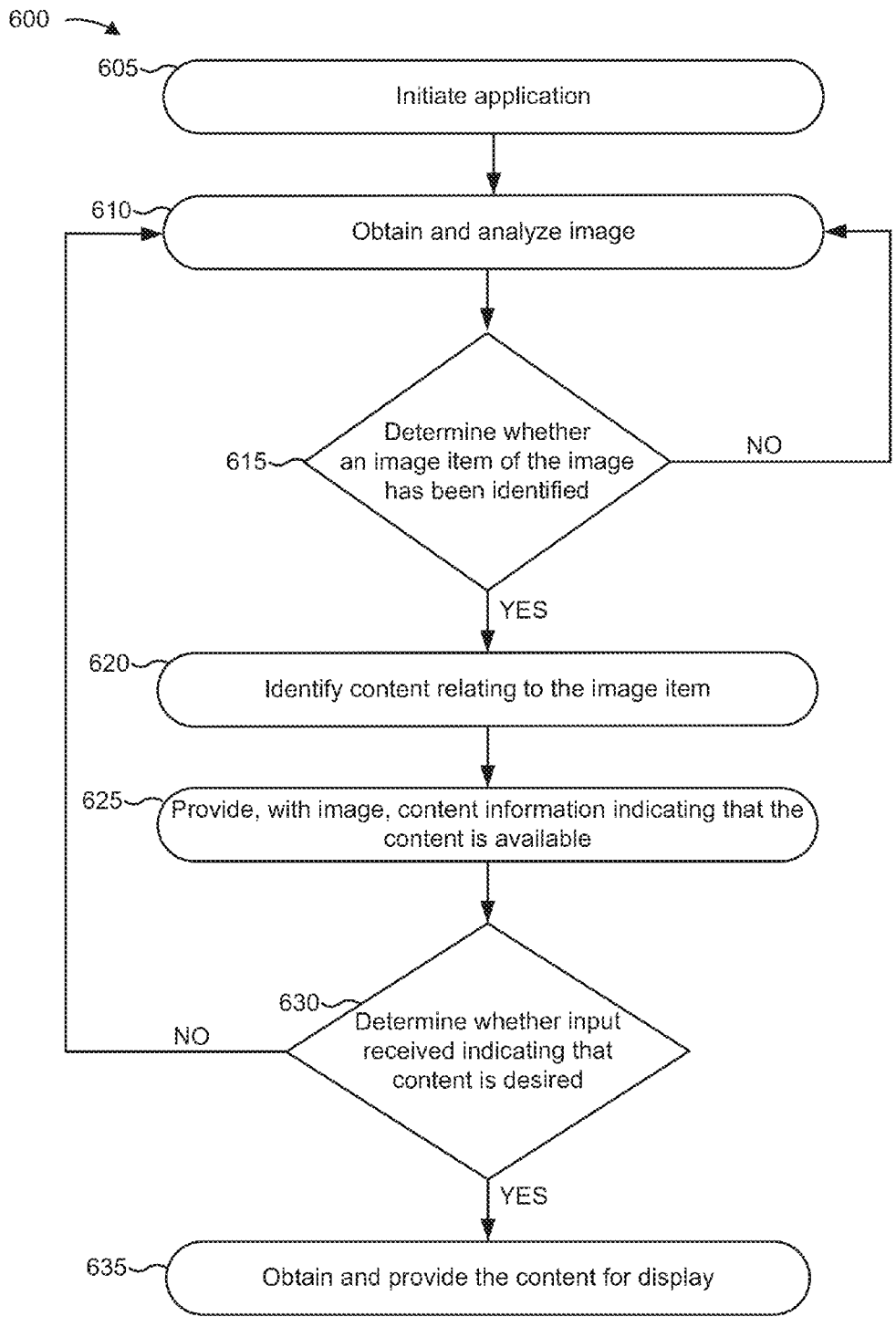

PROVIDING CONTENT BASED ON IMAGE ITEM

BACKGROUND

A device may include various components, such as a camera. The camera may be used to capture images and the images may be displayed by the device. The displayed images may include various pieces of information.

BRIEF DESCRIPTION OF DRAWINGS

FIG. 5 is a diagram of an example of the process described in FIG. 4;

FIG. 6 is a flow chart of an example process for identifying and obtaining content relating to image items in an image.

DETAILED DESCRIPTION OF PREFERRED EMBODIMENTS

The following detailed description refers to the accompanying drawings. The same reference numbers in different drawings may identify the same or similar elements.

A device may display an image. The image may include various visual items. Content, relating to the various items, may be available. For example, a web site, that provides information relating to the various items, may exist. However, a user of the device may not be aware that the content is available. Alternatively, the user may be aware (or may suspect) that the content is available and may desire to obtain the content. However, the content may be difficult to find and the user may be required to perform several actions before obtaining the content. Accordingly, the experience of the user may not be enhanced or may be negatively affected.

Systems and/or methods described herein may enable a device to identify content relating to image items in an image as supplemental content for the image and may enable the device to quickly obtain the content for a user of the device, thereby enhancing user experience.

As used herein, an image item may include an item, in an image, such as a person (e.g., a face of the person, eyes, etc.), an object, textual information, graphical information (e.g., a logo), or any other type of information included in an image.

Figure 1B:
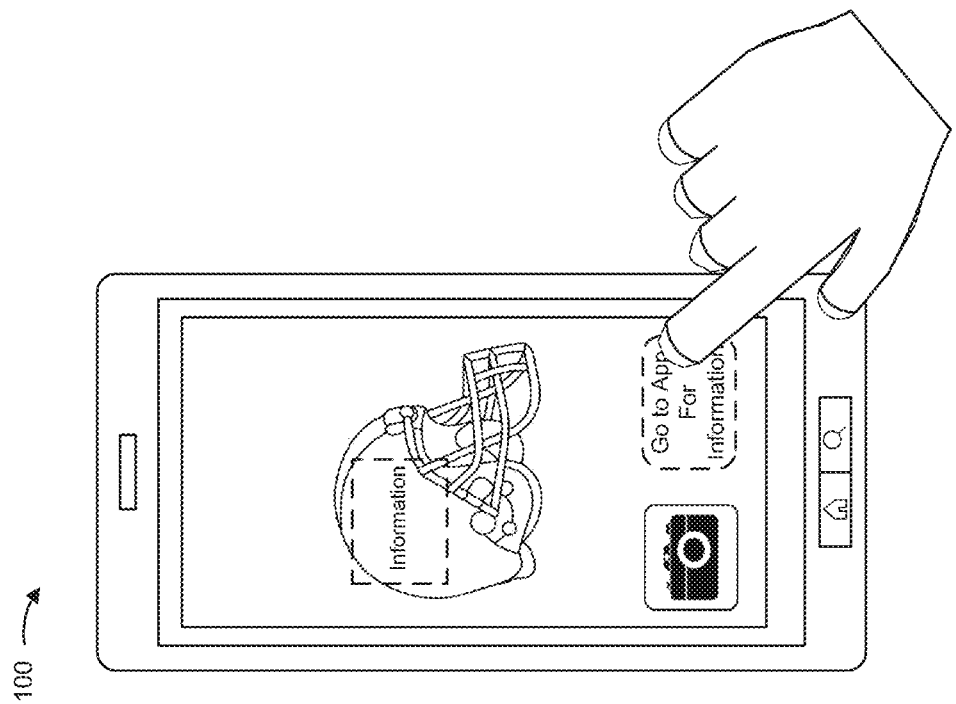
FIGS. 1A-1C are diagrams of an overview of an implementation described herein.
Figure 1A:
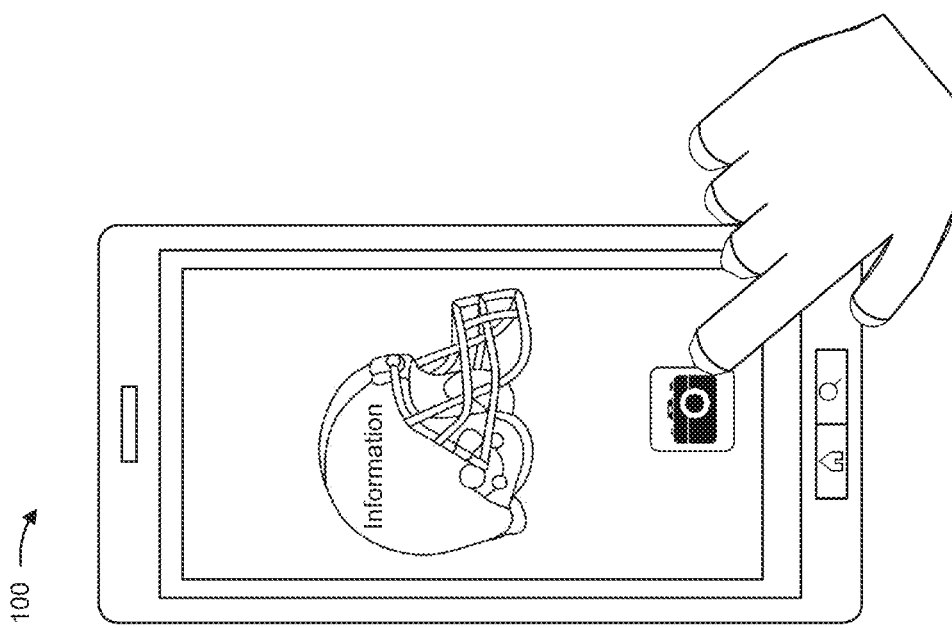
Figure 1C:
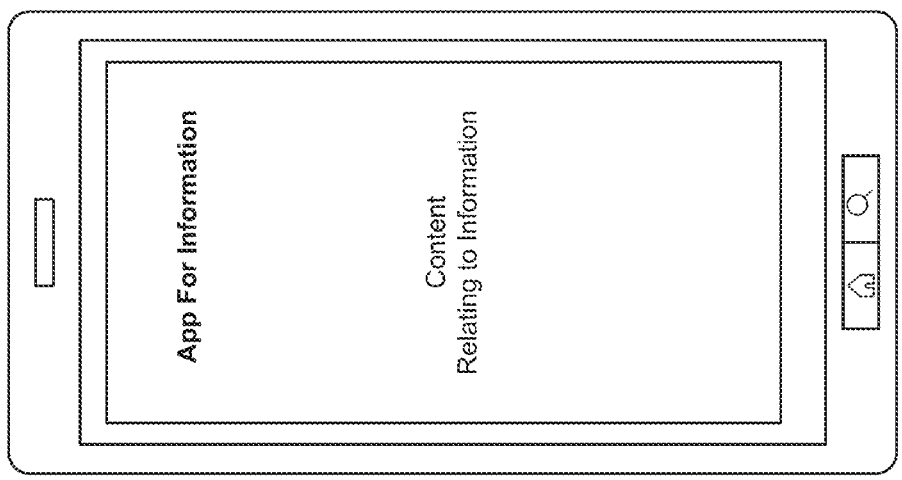

FIGS. 1A-1C are diagrams of an overview of an implementation described herein. As shown in FIG. 1A, assume that a user is using an application (e.g., a camera application) of a user device (e.g., a smart phone) to view an image. Further, assume that the application is integrated with a supplemental content application and that the supplemental content application has been initiated and is running as a background process on the user device. As further shown in FIG. 1A, assume that the image includes a football helmet.

As shown in FIG. 1B, assume that the supplemental content application has identified a piece of information on the football helmet as an image item in the image. Further assume that the supplemental content application has identified content relating to the piece of information. For example, assume that the supplemental content application has identified an application that provides the content relating to the piece of information on the football helmet. As further shown in FIG. 1B, the supplemental content application may provide, with the image, an indication that the image item has been identified. As further shown in FIG. 1B, the supplemental content application may also provide, with the image, an indication that the content relating to the piece of information is available. As further shown as an example in FIG. 1B, the indication may be provided as an icon or button for the identified application.

As shown in FIG. 1C, assume that the user has selected the icon or button. The supplemental content application may initiate the identified application after the user selects the icon or button and the identified application may provide the content relating to the piece of information.

Thus, systems and/or methods described herein may facilitate identifying and obtaining content relating to an image item in an image.

Figure 2:
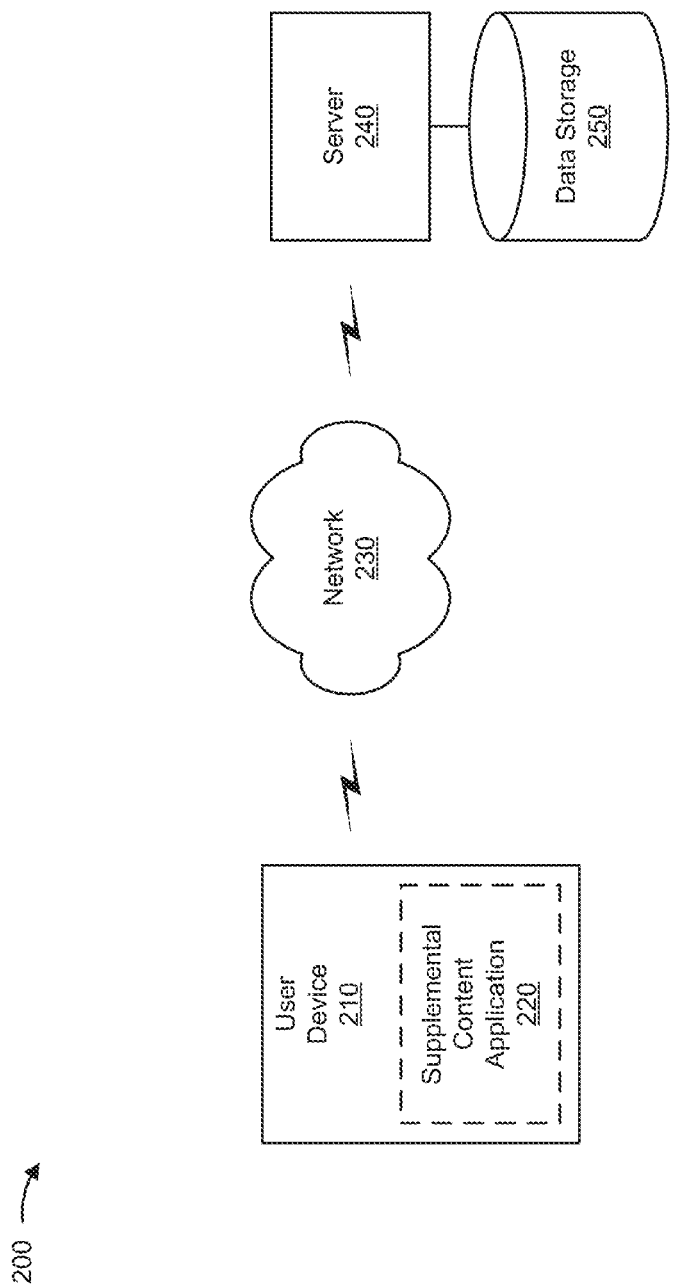
FIG. 2 is a diagram of an example environment in which systems and/or methods described herein may be implemented.

FIG. 2 is a diagram of an example environment 200 in which systems and/or methods described herein may be implemented. Environment 200 may include a user device 210, a network 230, a server 240, and a data storage 250. The devices of environment 200 may communicate via wired connections, wireless connections, or a combination of wired connections and wireless connections.

User device 210 may include one or more devices that are capable of identifying and obtaining content relating to image items in images. For example, user device 210 may include a smart phone, a desktop computer, a laptop computer, a tablet computer, a gaming device, and/or another type of wired or wireless user device. In some implementations, user device 210 may include supplemental content application 220. For example, user device 210 may be preloaded with supplemental content application 220. For instance, supplemental content application 220 may be part of a camera application of user device 210. In some implementations, user device 210 may download supplemental content application 220. In some implementations, user device 210 may be configured, using supplemental content application 220, to analyze images (e.g., displayed to a user of user device 210) to determine whether content, relating to image items in the images, is available and to obtain the content when the content is available.

Network 230 may include one or more wired and/or wireless networks. For example, network 230 may include a cellular network, a public land mobile network ("PLMN"), a second generation ("2G") network, a third generation ("3G") network, a fourth generation ("4G") network, a fifth generation ("5G") network, a long term evolution ("LTE") network, and/or a similar type of network. Additionally, or alternatively, network 230 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a satellite network, a cloud computing network, and/or a combination of these or other types of networks.

Server 240 may include one or more server devices. In some implementations, server 240 may transmit supplemental content application 220 to user device 210. Additionally, or alternatively, server 240 may receive images from user device 210 and may analyze the images to determine whether content, relating to image items in the images, is available. Additionally, or alternatively, server 240 may obtain the content and provide the content to user device 210.

Data storage 250 may include one or more storage devices that store information in one or more data structures, such as one or more databases, tables, lists, trees, etc. In some implementations, data storage 250 may be included within or otherwise accessible by server 220. In some implementations, the information may be received from devices of various entities. In some implementations, the information may include information associated with products, services, events, and/or content associated with the various entities. Additionally, or alternatively, the information may include images associated with entities (e.g., team logos, images of mascots, images of team players, images of stadiums, etc.); names associated with entities (e.g., team names, team nicknames, school names, etc.); and other information associated with the entities. In some implementations, the information may be updated by the devices of the various entities. Additionally, or alternatively, the information may include information associated with applications installed on user device 210.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
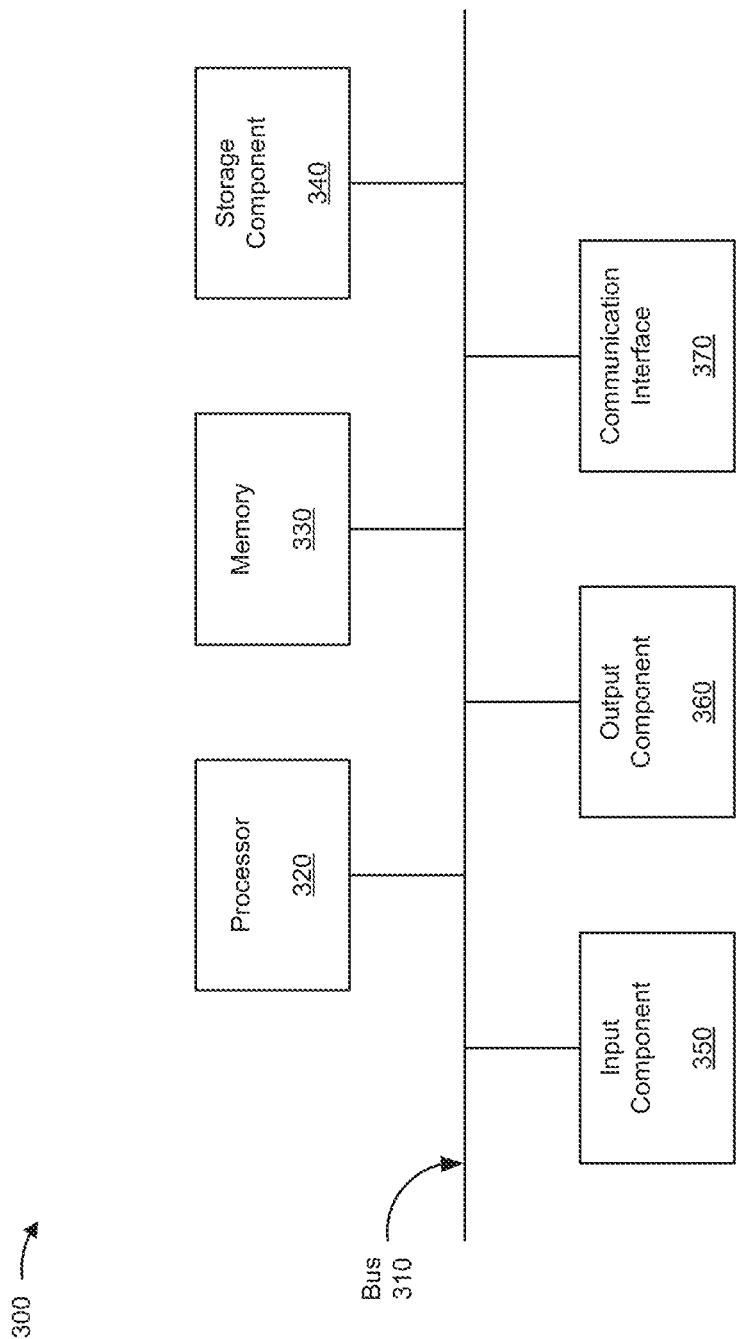
FIG. 3 is a diagram of example components of one or more devices of FIG. 2.

FIG. 3 is a diagram of example components of a device 300. Device 300 may correspond to user device 210 and/or server 240. Additionally, or alternatively, each of user device 210 and/or server 240 may include one or more devices 300 and/or one or more components of device 300. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a camera, a microphone, a switch, etc.). Output component 350 may include a component that outputs information from device 300 (e.g., a display, an audio speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, a communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
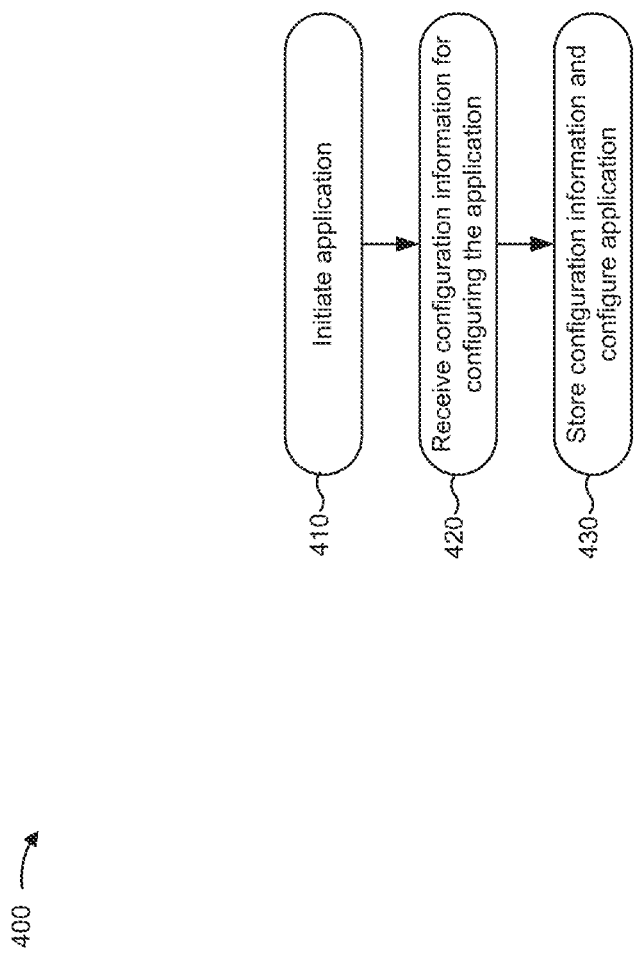
FIG. 4 is a flow chart of an example process for configuring a user device.

FIG. 4 is a flowchart of an example process 400 for configuring a user device to identify, obtain, and provide content relating image items in an image. In some implementations, process 400 may be performed by user device 210. In some implementations, one or more process blocks of FIG. 4 may be performed by another device or a group of devices separate from or including user device 210, such as server 240.

As shown in FIG. 4, process 400 may include initiating an application (block 410). For example, after receiving and installing supplemental content application 220, user device 210 may receive a request (e.g., from a user of user device 210) to initiate supplemental content application 220 and may cause supplemental content application 220 to be initiated. In some implementations, supplemental content application 220 may be pre-loaded with information that may enable supplemental content application 220 to identify and obtain content relating to image items in an image. The information may include a portion of the information stored on data storage 250. In some implementations, the information may be downloaded to user device 210 based on a request from the user and/or an authorization from the user.

In some implementations, user device 210 may be pre-loaded with supplemental content application 220. For example, supplemental content application 220 may be integrated with an application, of user device 210, that enables the user to view images. In some implementations, user device 210 may receive supplemental content application 220 from a memory. For example, user device 210 may receive supplemental content application 220 from a flash drive, a Compact Disc-Read-Only Memory (CD-ROM), ROM, Random-access Memory (RAM), or any other type of memory.

In some implementations, user device 210 may transmit a request to server 240 and may receive supplemental content application 220 based on the request. After receiving supplemental content application 220, user device 210 may store supplemental content application 220 in a memory associated with user device 210 and install supplemental content application 220.

As further shown in FIG. 4, process 400 may include receiving configuration information for configuring the application (block 420). For example, user device 210 may receive the configuration information, via supplemental content application 220, to configure supplemental content application 220 after initiating supplemental content application 220.

In some implementations, the user, of user device 210, may submit the configuration information to configure supplemental content application 220 using one or more elements of one or more user interfaces provided by user device 210. The one or more elements may include, for example, a text input element, a drop down menu element, a checkbox element, a radio button element, and/or any other type of element that may be used to receive the information from the user. In some implementations, the configuration of supplemental content application 220 may be performed automatically (i.e., without user intervention) by supplemental content application 220 (e.g., based on a trigger event, such as a date and/or a time, a calendar event, information regarding a location of user device 210, etc.). In some implementations, the configuration of supplemental content application 220 may be performed based on a request from the user.

In some implementations, the configuration information may include information identifying an amount of time to elapse, after an image is displayed by user device 210, before the image is to be analyzed to identify image items of the image and content relating to the image items. For example, the user of user device 210 may submit, via supplemental content application 220, the information identifying the amount of time. In some implementations, supplemental content application 220 may analyze the image to identify the content relating to the image items after expiration of the amount of time. Additionally, or alternatively, supplemental content application 220 may transmit the image to server 240 to analyze the image to identify the content relating to the image items after expiration of the amount of time.

Additionally, or alternatively, the configuration information may include information identifying a quantity of images to be transmitted to server 240 during a period of time. For example, the user of user device 210 may submit information identifying, via supplemental content application 220, the information identifying the quantity of images and the period of time. In some implementations, the quantity of images may correspond to a maximum quantity of images to be transmitted to server 240 during the period of time. In some implementations, the quantity of images may correspond to a minimum quantity of images to be transmitted to server 240 during the period of time.

Additionally, or alternatively, the configuration information may include information identifying different types for the content relating to the image items. The content may include information regarding products, information regarding services, audio content, visual content, textual content, or the like. For example, the user of user device 210 may submit, via supplemental content application 220, information identifying different types for the content relating to the images. In some implementations, the different types may correspond to types or categories of content to be included in the content relating to the images. For example, the user may submit information identifying content relating to sports, information identifying content relating to children, information identifying content relating to traveling, information identifying content relating to automobiles, etc. Additionally, or alternatively, the user may submit, via supplemental content application 220, information identifying sub-categories within the different categories. For example, the user may identify an interest for content relating to basketball, an interest for content relating to a particular age or a range of ages for children (e.g., baby, toddler, ages 5 to 7, etc.), an interest for content relating to traveling in Europe, an interest for content relating to American automobiles, etc. In some implementations, the different types may correspond to types of content to be excluded from the content relating to the images.

Additionally, or alternatively, the configuration information may include information for initiating applications of user device 210 based on the image items. For example, the user of user device 210 may submit, via supplemental content application 220, the information for initiating the applications based on identifying the image items.

In some implementations, the user may submit information regarding the applications of user device 210 to be identified based on the image items. For example, the user of user device 210 may submit, via supplemental content application 220, information identifying the applications of user device 210 to be identified. In some implementations, the user may submit information regarding different image items, relating to a respective application of the applications, that cause the respective application to be identified. For example, the user may submit information identifying image items relating to cars, trucks, and motorcycles as image items that cause a car researching application of user device 210 to be identified. Additionally, or alternatively, the user may submit information identifying image items relating to homes, buildings, and office spaces as image items that cause a real estate application of user device 210 to be identified.

In some implementations, the user may submit information regarding a particular image item and may submit information identifying applications to be identified based on the particular image item. For example, the user may submit information identifying an image item relating to a music artist and may submit information identifying a music player application, a song library application, and a music streaming application as applications to be identified based on the image item relating to the music artist. Additionally, or alternatively, the user may submit information identifying an image item relating to a television program and may submit information identifying a video player application, a content provider application, and a video program database application as applications to be identified based on the image item relating to the television program.

Additionally, or alternatively, the user may submit information identifying an action to be performed when the respective application is initiated. In some implementations, the user may submit information identifying a particular user interface, of various user interfaces of the respective application, to be displayed when the respective application is initiated. For example, the user may identify a last user interface, of the respective application, used by the user. In some implementations, the user may submit information identifying a particular section, of the respective application, that the user accessed last. In some implementations, the user may submit information identifying a particular portion, of the respective application, last used by the user. In some implementations, the user may submit information indicating that a user interface of the respective application is to be populated with information regarding a particular image item based on which the respective application was identified. For example, the user may submit information indicating that a user interface of a car research application is to be populated with information regarding a car (the particular image item based on which the car research application was identified), such as make, model, color, etc. Additionally, or alternatively, the user may submit information indicating that the respective application is to obtain additional information regarding the particular image item. For example, the user may submit information indicating that a car research application is to perform a search based on the information regarding the car to identify additional information regarding the car, such as information identifying a dealership selling cars that are the same as and/or similar to the car.

Additionally, or alternatively, the configuration information may include information identifying conditions relating to the use of supplemental content application 220. In some implementations, the conditions may include locations of user device 210. For example, the user may submit information identifying locations at which supplemental content application 220 is to be enabled. Additionally, or alternatively, the user may submit information identifying locations at which supplemental content application 220 is to be disabled. In some implementations, the conditions may include strength of network connection. For example, the user may submit information identifying a threshold strength of network connection. For instance, supplemental content application 220 may be enabled when a strength of network connection meets the threshold, and supplemental content application 220 may be disabled when the strength of network connection does not meet the threshold.

As further shown in FIG. 4, process 400 may include storing the configuration information and configuring the application based on the configuration information (block 430). For example, the configuration information may be stored in a data structure associated with user device 210. In some implementations, the configuration information may be transmitted to another device (onto which supplemental content application 220 has been installed) to configure supplemental content application 220 of the other device. For example, the configuration information may be used to automatically configure supplemental content application 220 of the other device. In some implementations, user device 210 may receive, from another device (e.g., associated with the user), the configuration information generated by configuring supplemental content application 220 on the other device. By way of example, the configuration information, received from the other device, may be combined with the configuration information of user device 210 to further configure supplemental content application 220 of user device 210. In some implementations, when supplemental content application 220 identifies a configuration conflict relative to the configuration information, supplemental content application 220 may provide information identifying the conflict to the user and receive input from the user to resolve the conflict. In some implementations, supplemental content application 220 may automatically resolve the conflict based on usage information (e.g., information identifying locations where supplemental content application 220 is used, information identifying applications identified and initiated via supplemental content application 220, information identifying actions typically performed when the applications are initiated, information identifying strength of network connection, etc.).

In some implementations, the configuration information may be generated for each user of different users of user device 210. For example, supplemental content application 220 may enable each user to create an account that may be accessed using a username and/or a password unique to each user, log into the account using the username and/or password, and configure supplemental content application 220 to generate configuration information that may be stored in one or more data structures. As such, each respective user may have unique configuration information to permit supplemental content application 220 to be tailored to the respective user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram of an example 500 of process 400 described above with respect to FIG. 4. In example 500, assume that a user, associated with user device 210, has installed supplemental content application 220 onto user device 210 and that the user has initiated supplemental content application 220. Further assume that the user desires to configure supplemental content application 220.

As shown in relation to FIG. 5, supplemental content application 220 may cause user device 210 to provide a user interface that allows the user to configure supplemental content application 220. For example, as shown in relation to FIG. 5, the user interface may allow the user to identify an amount of time to elapse, after an image is displayed by user device 210, before the image is to be analyzed to identify content relating to one or more image items of the image. As such, the image may be analyzed after the amount of time has elapsed. The amount of time may prevent images from being prematurely analyzed, thereby preserving resources used for analyzing the images. As shown as an example in FIG. 5, the user may identify 10 seconds as the amount of time.

As further shown in FIG. 5, the user interface may allow the user to identify a quantity of images to be transmitted to server 240 during a period of time. The quantity of images may prevent overload of server 240 that is caused by server 240 receiving, for analysis, a quantity of images that exceeds a threshold. Additionally, the quantity of images may prevent excessive usage of an amount of data allotted to the user. As shown as an example in FIG. 5, the user may identify one image is to be transmitted per minute.

As further shown in FIG. 5, the user interface may allow the user to identify locations at which supplemental content application 220 is to be enabled. Accordingly, supplemental content application 220 may be enabled at locations where usage of supplemental content application 220 is appropriate. As shown as an example in FIG. 5, the user may identify sports arenas/stadiums, tourist locations, and the user's home as locations at which supplemental content application 220 is to be enabled. As further shown in FIG. 5, the user interface may allow the user to identify locations at which supplemental content application 220 is to be disabled. Accordingly, supplemental content application 220 may be disabled at locations where usage of supplemental content application 220 is inappropriate (e.g., at work during work meetings). As shown as an example in FIG. 5, the user may identify the user's work as a location at which supplemental content application 220 is to be disabled.

As further shown in relation to FIG. 5, the user interface may allow the user to submit information regarding applications of user device 210 to be identified based on image items. As shown as an example in relation to FIG. 5, the user may identify a real estate application and may identify image items, based on which the real estate application is to be identified, such as homes, buildings, multiple listing service (MLS) identifiers, real estate for sale advertisements, and real estate for rent advertisements. As further shown in relation to FIG. 5, the user may submit additional information regarding the real estate application. As further shown in relation to FIG. 5, the user may submit information indicating that, when the real estate application is initiated, the real estate application is to cause a search to be performed using information regarding an image item based on which the real estate application was identified.

As further shown as an example in relation to FIG. 5, the user may identify an insurance application and may identify image items, based on which the insurance application is to be identified, such as cars, trucks, motorcycles, and vehicle identification numbers (VINs). As further shown as an example in relation to FIG. 5, the user may submit information indicating that, when the insurance application is initiated, the insurance application is to cause a search to be performed to identify a quote for an image item based on which the insurance application was identified. Alternatively, or additionally, the user may submit information indicating that, when the insurance application is initiated, the insurance application is to cause an insurance claim, associated with the image item, to be submitted.

As further shown as an example in relation to FIG. 5, the user may identify a sports application and may identify image items, based on which the sports application is to be identified, such as team logo, team name, stadiums/sports arena, team personnel (e.g., players, coaches, owners), etc. As further shown as an example in relation to FIG. 5, the user may submit information indicating that, when the sports application is initiated, the sports application is to provide a user interface that includes content relating to an image item based on which the sports application was identified.

As further shown in relation to FIG. 5, the user interface may allow the user to select a "SAVE" option to save the information submitted by the user as the configuration information.

FIG. 6 is a flowchart of an example process for identifying and obtaining content relating to image items in an image. In some implementations, process 600 may be performed by user device 210. In some implementations, one or more process blocks of FIG. 6 may be performed by another device or a group of devices separate from or including user device 210, such as server 240.

As shown in FIG. 6, process 600 may include initiating an application (block 605). For example, user device 210 may receive a request (e.g., from a user of user device 210) to initiate supplemental content application 220 and may cause supplemental content application 220 to be initiated based on the request. In some implementations, supplemental content application 220 may be integrated with a particular application of user device 210 that enables the user to view images and, as such, supplemental content application 220 may be initiated when the user initiates the particular application. For example, the particular application may include a camera application, an image editing application, an application for viewing received images (e.g., via text messaging, e-mail, etc.) and/or any application enabling the user to view images.

As further shown in FIG. 6, process 600 may include obtaining and analyzing an image (block 610). For example, after initiating supplemental content application 220, user device 210, via supplemental content application 220, may obtain and analyze an image. In some implementations, supplemental content application 220 may obtain the image from a view finder of a camera application. For example, the image may be obtained while the user is in the process of capturing the image. In some implementations, supplemental content application 220 may obtain the image from a gallery of images. For example, the image may be obtained while the user is viewing the image from a gallery of images stored in a memory associated with user device 210. The gallery of images may include images captured by user device 210 and/or images received by user device 210 from other devices. In some implementations, supplemental content application 220 may obtain the image from video content displayed by user device 210. For example, the image may be obtained while the user is viewing the video content.

In some implementations, supplemental content application 220 may determine a location of the user and may compare the location to locations identified in the configuration information to determine whether supplemental content application 220 is to be enabled or disabled. Additionally, or alternatively, supplemental content application 220 may determine whether a particular amount of time, after the image is displayed by user device 210, has elapsed and may analyze the image when the particular amount of time has elapsed. For instance, supplemental content application 220 may identify the particular amount of time in the configuration information. Additionally, or alternatively, supplemental content application 220 may analyze the image based on a request from the user. For example, the user may submit a request, via supplemental content application 220, to analyze the image to identify content relating to one or more image items of the image.

In some implementations, supplemental content application 220 may analyze the obtained image to identify one or more image items. In some implementations, supplemental content application 220 may analyze the obtained image by comparing the obtained image to information stored in a memory associated with user device 210 (e.g., memory 330 and/or a memory external to user device 210, such as data storage 250). For example, supplemental content application 220 may compare the obtained image to images stored in the memory. Additionally, or alternatively, supplemental content application 220 may compare the obtained image to other visual content stored in the memory. Additionally, or alternatively, supplemental content application 220 may compare the obtained image to textual content stored in the memory. Additionally, or alternatively, supplemental content application 220 may compare the obtained image to other types of content stored in the memory. Additionally, or alternatively, supplemental content application 220 may analyze the obtained image by performing an object recognition process on the obtained image, by performing a text recognition process on the obtained image, and/or by performing one or more other types of data recognition processes on the obtained image.

Additionally, or alternatively, supplemental content application 220 may transmit the obtained image to server 240 to analyze the obtained image. For example, server 240 may analyze the obtained image by comparing the obtained image to the information stored on data storage 250 to identify the one or more image items. In some implementations, server 240 may perform the comparison in a manner similar to the manner described above with respect to the comparison performed by supplemental content application 220. Additionally, or alternatively, server 240 may perform an object recognition process on the obtained image, an text recognition process on the obtained image, or the like in a manner similar to that described above with respect to supplemental content application 220. In some implementations, supplemental content application 220 may transmit the obtained image to server 240 based on the quantity of images to be transmitted to server 240 per period of time. For example, supplemental content application 220 may identify the quantity of images to be transmitted to server 240 per period of time in the configuration information and transmit the obtained image when the quantity of images per period of time would not be exceeded.

As further shown in FIG. 6, process 600 may include determining whether an image item of the obtained image has been identified (block 615). For example, based on the analysis of the obtained image, supplemental content application 220 may determine whether an image item, of the obtained image, has been identified. In some implementations, the image item may be identified when a portion of the obtained image matches a portion of stored information (e.g., a portion of the information stored in the memory associated with user device 210). Additionally, or alternatively, the image item may be identified as a result of the object recognition process, a result of the text recognition process, or the like. In some implementations, server 240 may transmit, to supplemental content application 220, information indicating that the image item has been identified after server 240 identifies the image item.

As further shown in FIG. 6, if no image item has been identified (block 615—NO), then process 600 may return to block 610. As further shown in FIG. 6, if an image item of the obtained image has been identified (block 615—YES), then process 600 may include identifying content relating to the image item (block 620). For example, supplemental content application 220 may determine that the content relating to the image item is available when the image item has been identified and may identify the content relating to the image item based on information regarding the image item. In some implementations, the information regarding the image item may identify the image item and/or a type of the image item.

In some implementations, supplemental content application 220 may identify information associated with an entity, based on the information regarding the image item, as part of identifying the content relating to the image item. For example, supplemental content application 220 may search the memory associated with user device 210, using the information regarding the image item, to identify the information associated with the entity. The information associated with the entity may include information associated with a product associated with the entity, a service associated with the entity, an event associated with the entity, and/or content associated with the entity (e.g., an image associated with the entity, a song associated with the entity, a video associated with the entity, or the like). Additionally, or alternatively, the information associated with the entity may include information identifying a web site associated with the entity. For example, the web site may provide the information associated with the product, the service, the event, and/or the content associated with the entity. In some implementations, the web site may be hosted by server 240.

Additionally, or alternatively, the information associated with the entity may identify an application, of user device 210, relating to the entity (e.g., an application created by or created for the entity). In some implementations, the information associated with the entity may be stored on the memory associated with user device 210 in association with the portion of the stored information based on which the image item was identified.

Additionally, or alternatively, server 240 may identify the information associated with the entity as part of identifying the content relating to the image item. For example, based on identifying the image item, server 240 may search a data storage (e.g., data storage 250), using the information regarding the image item, to identify the information associated with the entity. In some implementations, the information associated with the entity may be stored in the data storage in association with the portion of the stored information based on which the image item was identified.

Additionally, or alternatively, supplemental content application 220 may identify an application of user device 210 relating to the image item as part of identifying the content relating to the image item. In some implementations, supplemental content application 220 may search information regarding applications of user device 210, using the information regarding the image item, to identify the application of user device 210 relating to the image item. The information regarding the applications may be stored in the memory associated with user device 210. For example, if the image item relates to a vehicle, supplemental content application 220 may search the information regarding the applications to identify an application of user device 210 that relates to vehicles, such as a car researching application, a vehicle insurance application, and/or a car dealership application. Additionally, or alternatively, if the image item relates to sports, supplemental content application 220 may search the information regarding the applications to identify an application of user device 210 that relates to sports, such as a sports content provider application or a sporting goods retailer application. Additionally, or alternatively, if the image item relates to a particular type of sports (e.g., football), supplemental content application 220 may search the information regarding the applications to identify an application of user device 210 that relates to football, such as a professional football application or a professional football team's application.

Additionally, or alternatively, server 240 may identify the application of user device 210 relating to the image item as part of identifying the content relating to the image item. In some implementations, a copy of the information regarding the applications may be stored on data storage 250 and server 240 may search the copy of the information regarding the applications of user device 210, using the information regarding the image item, to identify the application of user device 210 relating to the image item.

In some implementations, supplemental content application 220 may search the configuration information, using the information regarding the image item, to identify the application of user device 210 relating to the image item. For example, supplemental content application 220 may search the configuration information, using the information regarding the image item, to determine whether the user has identified any application of user device 210 relating to the image item.

As further shown in FIG. 6, process 600 may include providing, with the image, content information indicating that the content is available (block 625). For example, after identifying the content relating to the image item, supplemental content application 220 may cause the content information to be provided with the image. In some implementations, the content information may identify a reference to the content relating to the image item. For example, the content information may include a link to a web site that provides the content relating to the image item, such as the web site associated with the entity. Additionally, or alternatively, the content information may identify the information identifying the application of user device 210 relating to the image item.

In some implementations, after identifying the content relating to the image item, server 240 may provide an indication to supplemental content application 220 that the content has been identified and supplemental content application 220 may cause the content information to be provided with the image based on receiving the indication. In some implementations, the indication may include the reference to the content. Additionally, or alternatively, the indication may include the information identifying the application of user device 210 relating to the image item.

In some implementations, supplemental content application 220 may cause the content information to be provided as graphical element (e.g., an icon, a button, etc.), as textual information, as information in an overlay, or the like. Additionally, or alternatively, supplemental content application 220 may cause the image item to be visually identified on the obtained image. For example, supplemental content application 220 may cause the image item to be visually distinguished from a remaining portion of the obtained image. For instance, supplemental content application 220 may cause graphical information to be provided around the image item and/or provided within a vicinity of the image item to indicate that the image item has been identified and that the content relating to the image item has been identified.

As further shown in FIG. 6, process 600 may include determining whether input was received indicating that content is desired (block 630). For example, after providing the content information with the image, supplemental content application 220 may determine whether the content information has been selected by the user of user device 210.

As further shown in FIG. 6, if the input indicating that content is desired was not received (block 630—NO), then process 600 may return to block 605. For example, supplemental content application 220 may determine that the user is not interested in the content information when the user has not selected the content information within a particular amount of time after the content information has been provided with the image. Process 600 may, therefore, return to block 610.

As further shown in FIG. 6, if the input indicating that content is desired was received (block 630—YES), then process 600 may include obtaining and providing the content relating to the image item for display (block 635). For example, based on detecting that the content information has been selected, supplemental content application 220 may obtain the content relating to the image item and may provide the content for display to the user. In some implementations, supplemental content application 220 may retrieve the content from the memory associated with user device 210. In some implementations, supplemental content application 220 may cause server 240 to retrieve the content from data storage 250. For example, supplemental content application 220 may transmit a request for the content to server 240. For instance, supplemental content application 220 may transmit the request to server 240 based on determining that the reference to the content has been selected. Server 240 may then retrieve the content from data storage 250 and may transmit the content to user device 210. In some implementations, supplemental content application 220 may cause a search to be performed on the Internet to identify the content. For example, supplemental content application 220 may cause the search to be performed based on the information regarding the image item.

In some implementations, supplemental content application 220 may provide the content relating to the image item via a particular user interface via which the image is provided. For example, supplemental content application 220 may cause the content to be provided simultaneously with the image via the particular user interface. In some implementations, supplemental content application 220 may identify a size of a display of user device 210 and may determine whether to provide the content simultaneously with the image based on the size of the display.

In some implementations, supplemental content application 220 may provide the content relating to the image item via a user interface that is separate from the particular user interface via which the image is provided. For example, supplemental content application 220 may initiate a particular application and the particular application may provide the content via a user interface of the particular application. For instance, supplemental content application 220 may initiate a web browser application and cause the content to be provided via a web browser of the web browser application. By way of example, the content may be provided, via the web browser, as content of a web site. For instance, the content may include the information associated with the entity, as explained above, and the web site may be a web site associated with the entity.

Additionally, or alternatively, supplemental content application 220 may initiate an application of user device 210 relating to the image item and the content relating to the image item may be provided via a user interface of the application. For example, if the image item relates to a video program and supplemental content application 220 has identified an application of a particular content provider, supplemental content application 220 may initiate the application and cause the application to perform an action. For example, supplemental content application 220 may cause the application to search for informing regarding the video program (e.g., reviews, show times, actors, etc.), to provide the information regarding the video program, to download the video program, to play the video program, and/or to record the video program. In some implementations, when supplemental content application 220 has identified multiple actions for the application to perform, supplemental content application 220 may provide information identifying the multiple actions and may cause one or more of the multiple actions to be performed based on selection by the user. The content provider may include a cable television service provider, a satellite television service provider, a music service provider, an online video service provider, or the like.

Additionally, or alternatively, if the image item relates to a social media and supplemental content application 220 has identified a social media application, supplemental content application 220 may initiate the application and may cause the application to post a comment that includes information regarding the image item.

In some implementations, supplemental content application 220 may transmit the obtained image and the content information to another device, such as another device of the user or a device of another user associated with the user. For example, the obtained image and the content information may be transmitted based on a request from the user or without a request from the user. Additionally, or alternatively, supplemental content application 220 may transmit information to the other device to cause the other device to initiate the application relating to the content item on the other device or to download or initiate the application.

It will be apparent that multiple applications, relating to the image item, may be identified. Additionally, or alternatively, multiple image items may be identified. While process 600 has been described with respect to images and image items, process 600 may apply to other types of content. For example, supplemental content application 220 may obtain audio information, search the stored information to identify information that matches a portion of the audio information, and obtain and provide content relating to the portion of the audio information.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7C:
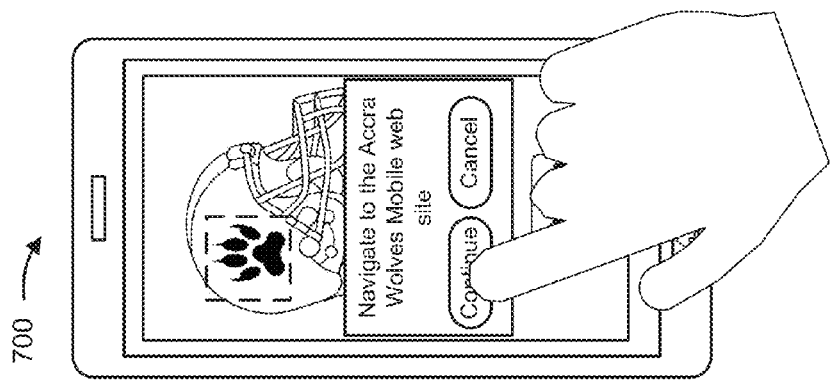
FIGS. 7A-7F and 8A-8C are diagrams of examples of the process described in FIG. 6.
Figure 7B:
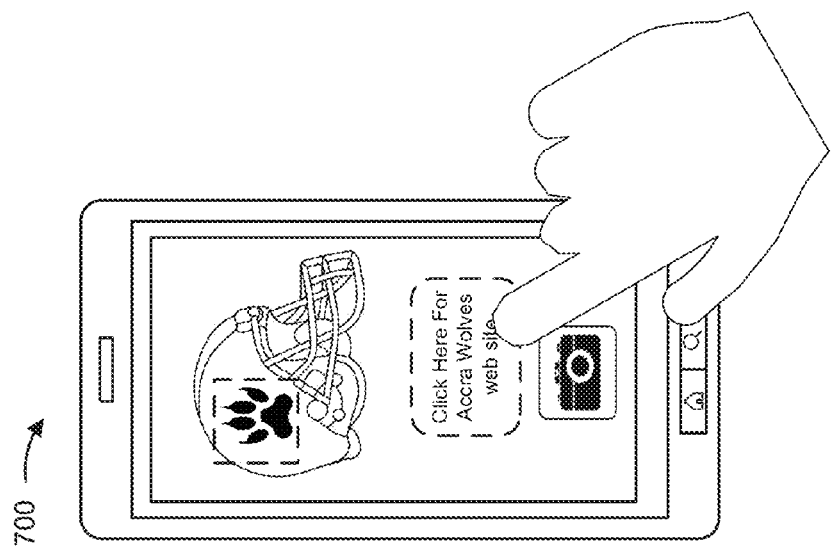
Figure 7A:
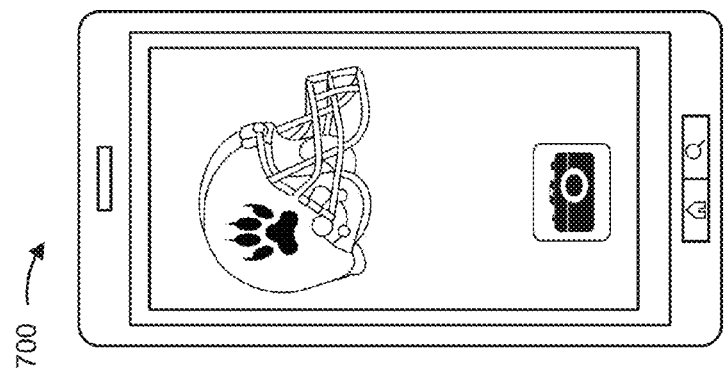
Figure 7F:
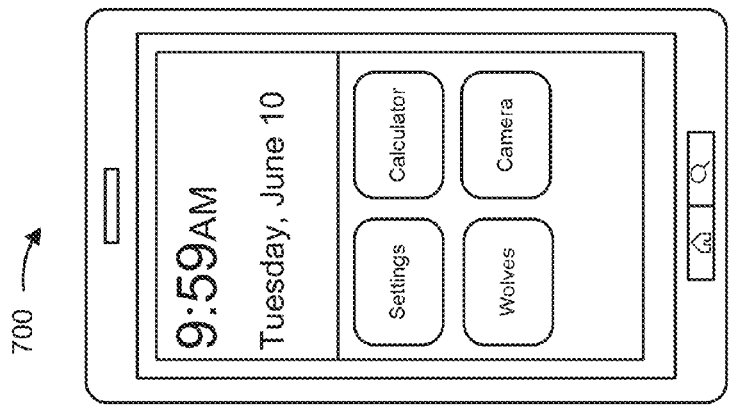

FIGS. 7A-7F are diagrams of an example 700 of process 600 described above with respect to FIG. 6. For the purposes of example 700, assume that a user has initiated a camera application of user device 210 and that the user is in the process of capturing an image using the camera application. Further, assume that supplemental content application 220 is integrated with the camera application and has been initiated with the camera application. Further, assume that supplemental content application 220 is running as a background process on user device 210. As shown in FIG. 7A, assume that an image of a football helmet is provided within a view finder of the camera application. Supplemental content application 220 may analyze the image to identify, among other things, a logo on the football helmet as an image item of the image.

For the purposes of example 700, further assume that supplemental content application 220 has identified the logo as a logo for the Accra Wolves team. For example, assume supplemental content application 220 has caused a search to be performed (e.g., a search of the memory associated with user device 210, a search of the Internet, and/or a search of data storage 250) based on the image and that an image of the logo for the Accra Wolves team has been identified as a match for the logo on the helmet. Further, assume supplemental content application 220 has identified content relating to the Accra Wolves team. For example, assume supplemental content application 220 has caused a search to be performed (e.g., a search of the memory associated with user device 210, a search of the Internet, and/or a search of data storage 250) to identify the content, such as a web site of the Accra Wolves. Further, assume supplemental content application 220 has identified a web browser application via which the content may be provided. As shown as an example in FIG. 7B, supplemental content application 220 may cause the logo on the football helmet to be visually distinguished from a remaining portion of the image within the view finder of the camera application. For example, supplemental content application 220 may cause graphical information to be presented around the logo, such as a dotted line. As shown as an example in FIG. 7B, supplemental content application 220 may cause information, identifying the content, to be provided with the image within the view finder (e.g., a button labeled Click Here For Accra Wolves web site).

As shown in FIG. 7B, assume that the user has selected the button. As further shown as an example in FIG. 7C, supplemental content application 220 may provide, with the image within the view finder, information requesting that the user confirms the selection of the button. As shown in FIG. 7C, assume that the user has confirmed the selection. Further assume that supplemental content application 220 has submitted a request for the content relating to the logo based on detecting the selection of the button. For example, assume that supplemental content application 220 has submitted a request, to server 240, for the web site of the Accra Wolves and that content of the web site of the Accra Wolves has been received from server 240. As shown as an example in FIG. 7D, supplemental content application 220 may cause the web browser application to be initiated and may cause the web browser application to provide the content of the web site of the Accra Wolves as the content relating to the logo on the football helmet.

Figure 7E:
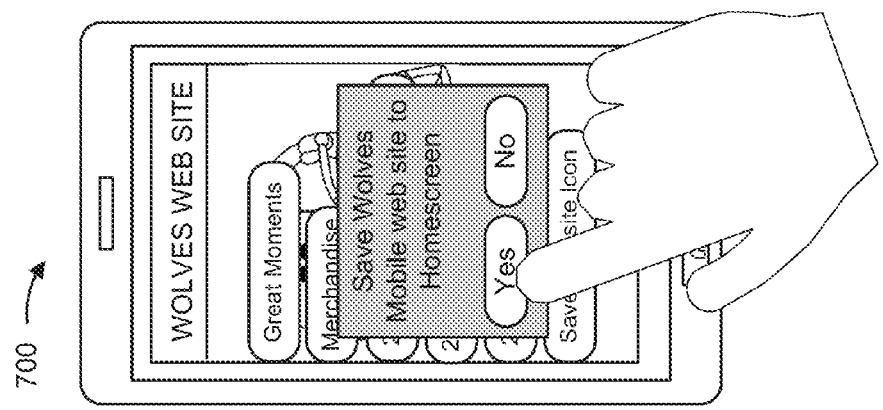
Figure 7D:
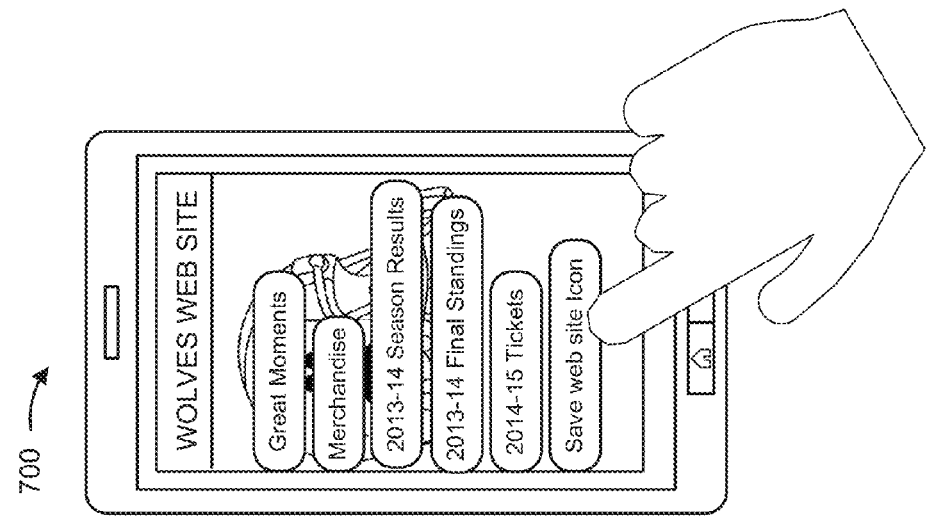

As shown in FIG. 7E, assume that the user has selected an option to save an icon of the web site (e.g., as a shortcut to the web site) on a home screen interface of user device 210. As shown as an example in FIG. 7E, assume that the user has confirmed the selection of the option. As shown as an example in FIG. 7F, supplemental content application 220 may cause the icon of the web site to be saved on the home screen.

Figure 8C:
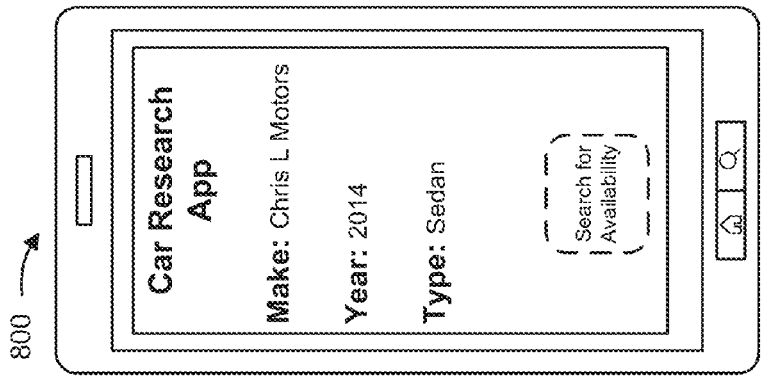
Figure 8B:
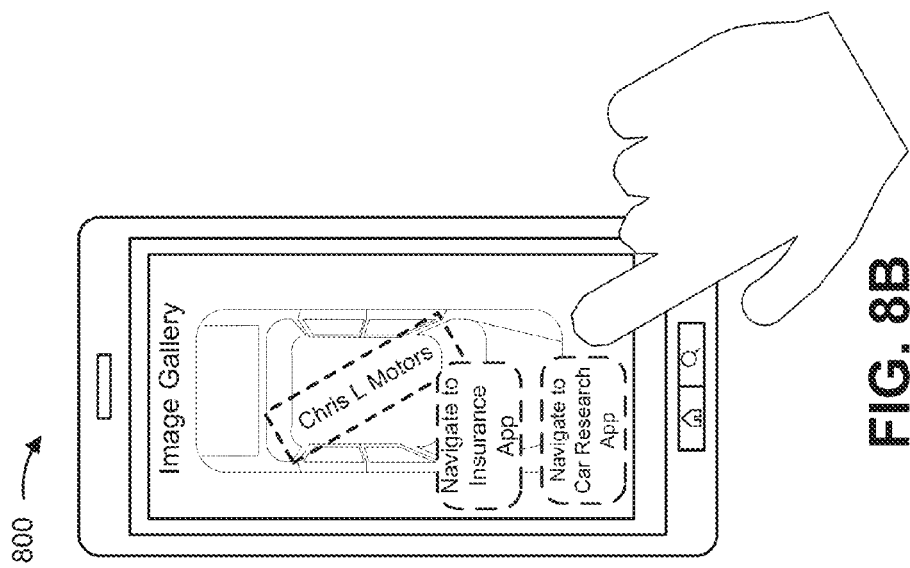
Figure 8A:
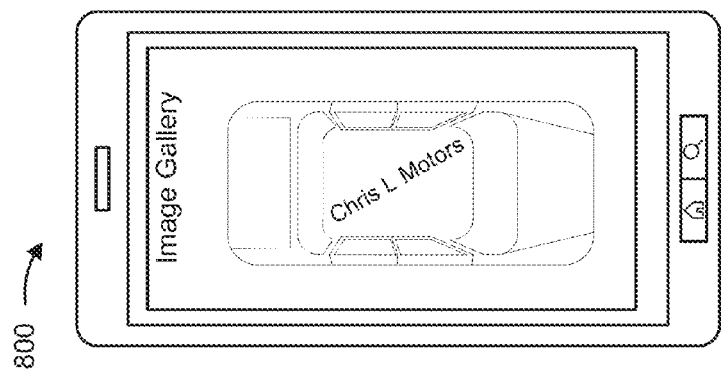

FIGS. 8A-8C are diagrams of an example 800 of process 600 described above with respect to FIG. 6. For the purposes of example 800, assume that a user has initiated an image gallery application of user device 210 and that the user is viewing an image, of the image gallery, using the image gallery application. Further, assume that supplemental content application 220 is integrated with the image gallery application and has been initiated based on the image gallery application being initiated. Further, assume that supplemental content application 220 is running as a background process on user device 210. As shown in FIG. 8A, the image, viewed by the user, is an image of a car. Supplemental content application 220 may analyze the image to identify a brand of the car as an image item of the image.

For the purposes of example 800, further assume that supplemental content application 220 has identified the brand of the car as Chris L Motors. For example, assume that supplemental content application 220 has caused a search to be performed (e.g., a search of the memory associated with user device 210, a search of the Internet, and/or a search of data storage 250) based on the image and that an image representing Chris L Motors has been identified as a match for the brand of the car. Further, assume supplemental content application 220 has identified content relating to Chris L Motors. For example, assume supplemental content application 220 has caused a search to be performed (e.g., a search of information regarding applications of user device 210 stored on the memory associated with user device 210 and/or data storage 250) using information regarding Chris L Motors and that applications relating to Chris L Motors have been identified as part of content relating to Chris L Motors. For instance, assume that a car researching application and a car insurance application have been identified. As shown as an example in FIG. 8B, supplemental content application 220 may cause the Chris L Motors to be visually distinguished from a remaining portion of the image. As further shown as an example in FIG. 8B, supplemental content application 220 may cause information identifying the car researching application and the car insurance application to be provided with the image (e.g., a first button labeled Navigate to Insurance App, and a second button labeled Navigate to Car Research App).

As shown in FIG. 8B, assume that the user has selected the second button. Based on the user selecting the second button, supplemental content application 220 may cause the car researching application to be initiated. Supplemental content application 220 may also cause the car researching application to populate an interface, of the car researching application, with information regarding the car and the Chris L Motors brand. As shown as an example in FIG. 8C, the interface may be populated with the information regarding the car and the Chris L Motors brand. As further shown as an example in FIG. 8C, the interface may include a button labeled Search for Availability. Upon selection of the button, a search based on information regarding the car and the Chris L Motors brand may be performed.

Systems and/or methods, described herein, may enable a device to identify content relating to image items in an image, and may enable the device to quickly and easily obtain the content for presentation to a user of the device.

The foregoing disclosure provides illustration and description, but is not intended to be exhaustive or to limit the embodiments to the precise form disclosed. Modifications and variations are possible in light of the above disclosure or may be acquired from practice of the embodiments.

As used herein, the term component is intended to be broadly construed as hardware, firmware, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that example aspects, as described above, may be implemented in many different forms of firmware, hardware, and a combination of hardware and software in the implementations illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device comprising:
a memory to store instructions; and
one or more processors to execute the instructions to:
automatically analyze an image,
automatically identify an image item included in the image based on automatically analyzing the image,
automatically identify content relating to the image item,
when automatically identifying the content, the one or more processors are to:
automatically identify an application, of the device, relating to the image item,
the content being provided via the application,
automatically provide, for display with the image, information indicating that the content is available,
receive input indicating a desire for the content, and
provide the content for display based on receiving the input indicating the desire for the content,
when providing the content, the one or more processors are to:
initiate the application, and
cause the content to be provided via the application.

2. The device of claim 1, where, when automatically providing the information indicating that the content is available, the one or more processors are to:
visually distinguish the image item in the image.

3. The device of claim 1, where, when automatically providing the information indicating that the content is available, the one or more processors are to:
provide, with the image, a graphical element relating to the content, and
where, when receiving the input indicating the desire for the content, the one or more processors are to:
detect a selection of the graphical element.

4. The device of claim 1, where, when automatically identifying the application relating to the image item, the one or more processors are to:
identify the application, relating to the image item, based on information regarding the image item.

5. The device of claim 1, where the one or more processors are further to:
obtain the image from a view finder of a camera application of the device, or
obtain the image from images stored in the memory of the device.

6. The device of claim 1, where, when causing the content to be provided via the application, the one or more processors are to:
cause the content to be provided via a particular user interface of a plurality of user interfaces of the application.

7. The device of claim 6, where the one or more processors are further to:
receive information identifying the particular user interface prior to analyzing the image,
where, when causing the content to be provided via the particular user interface, the one or more processors are to:
cause the content to be provided via the particular user interface based on the information identifying the particular user interface.

8. A non-transitory computer-readable medium storing instructions, the instructions comprising:
one or more instructions which, when executed by one or more processors of a device, cause the one or more processors to:
automatically analyze an image,
automatically determine that an image item is included in the image based on automatically analyzing the image,
automatically identify content relating to the image item,
the one or more instructions to automatically identify the content including:

one or more instructions to automatically identify an application, from a plurality of applications of the device, relating to the image item, automatically provide, for display with the image, information indicating that the content is available after automatically identifying the content relating to the image item, receive input indicating a desire for the content after automatically providing the information indicating that the content is available, and provide the content for display based on receiving the input indicating the desire for the content, the one or more instructions to provide the content including:

one or more instructions to initiate the application, and one or more instructions to cause the content to be provided via the application.

9. The non-transitory computer-readable medium of claim 8, where the one or more instructions to initiate the application include one or more instructions to initiate a web browser application, and where the one or more instructions to cause the content to be provided via the application include one or more instructions to cause the content to be provided via a web browser of the web browser application.

10. The non-transitory computer-readable medium of claim 8, where the one or more instructions to automatically analyze the image include:

one or more instructions to compare the image to information stored in a memory associated with the device;

one or more instructions to perform an object recognition process on the image; or one or more instructions to perform a text recognition process on the image.

11. The non-transitory computer-readable medium of claim 8, where the instructions further include:

one or more instructions to obtain the image from a camera application of the device; or one or more instructions to obtain the image from images stored in a memory of the device.

12. The non-transitory computer-readable medium of claim 8, where the one or more instructions to automatically provide the information indicating that the content is available include:

one or more instructions to visually distinguish the image item in the image.

13. The non-transitory computer-readable medium of claim 8, where the one or more instructions to automatically identify the content relating to the image item include:

one or more instructions to identify the content relating to the image item based on information regarding the image item.

14. The non-transitory computer-readable medium of claim 8, where the one or more instructions to automatically provide the information indicating that the content is available include:

provide, with the image, a graphical element relating to the content, and where, when receiving the input indicating the desire for the content, the one or more processors are to:

detect a selection of the graphical element.

15. A method comprising:

automatically determining, by a device, that an image item is included in an image;

automatically identifying, by the device, content relating to the image item based on information regarding the image item;

automatically providing, by the device and for display with the image, information indicating that the content is available;

receiving, by the device, input indicating a desire for the content; and providing, by the device, the content for display based on receiving the input indicating the desire for the content, providing the content including:

providing the content for display with the image, or causing the content to be provided via an application of the device.

16. The method of claim 15, further comprising:

transmitting the image to another device to cause the other device to analyze the image.

17. The method of claim 16, where determining that the image item is included in the image includes:

receiving, from the other device, information indicating that the image item has been identified in the image.

18. The method of claim 15, where automatically identifying the content relating to the image item includes:

identifying the application based on the information regarding the image item, and where providing the content includes:

initiating the application, and causing the content to be provided via the application after initiating the application.

19. The method of claim 15, further comprising:

receiving, from a user of the device, information identifying a particular user interface, of a plurality of user interfaces of the application, prior to identifying the content, where causing the content to be provided via the application includes:

causing the content to be provided via the particular user interface based on the information identifying the particular user interface.

20. The method of claim 15, where automatically identifying the content relating to the image item includes:

automatically determining that the image item relates to social media, automatically identifying a social media application of the device, as the application, based on determining that the image item relates to social media, and where providing the content includes:

initiating the social media application, and causing the social media application to post a comment relating the image item.

* * * * *